No. 865,953. PATENTED SEPT. 10, 1907.
J. P. SHAW.
ANIMAL YOKE.
APPLICATION FILED MAY 9, 1907.
2 SHEETS—SHEET 1.
Fig. 1.
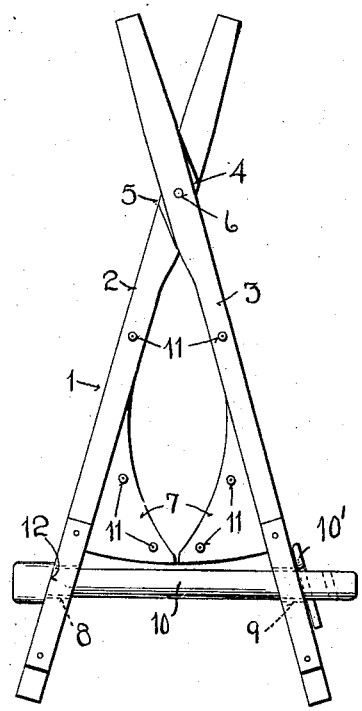
Fig. 2.
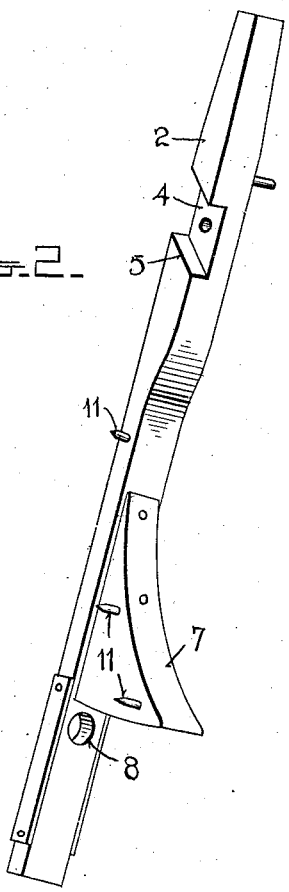
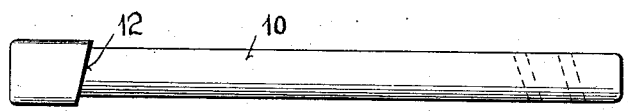
Fig. 3.
Witnesses
L. B. James
C. H. Griesbauer
Inventor
J. P. Shaw
by H. B. Willson & Co.
Attorneys
THE NORRIS PETERS CO., WASHINGTON, D. C.

No. 865,953. PATENTED SEPT. 10, 1907.
J. P. SHAW.
ANIMAL YOKE.
APPLICATION FILED MAY 9, 1907.
2 SHEETS—SHEET 2.
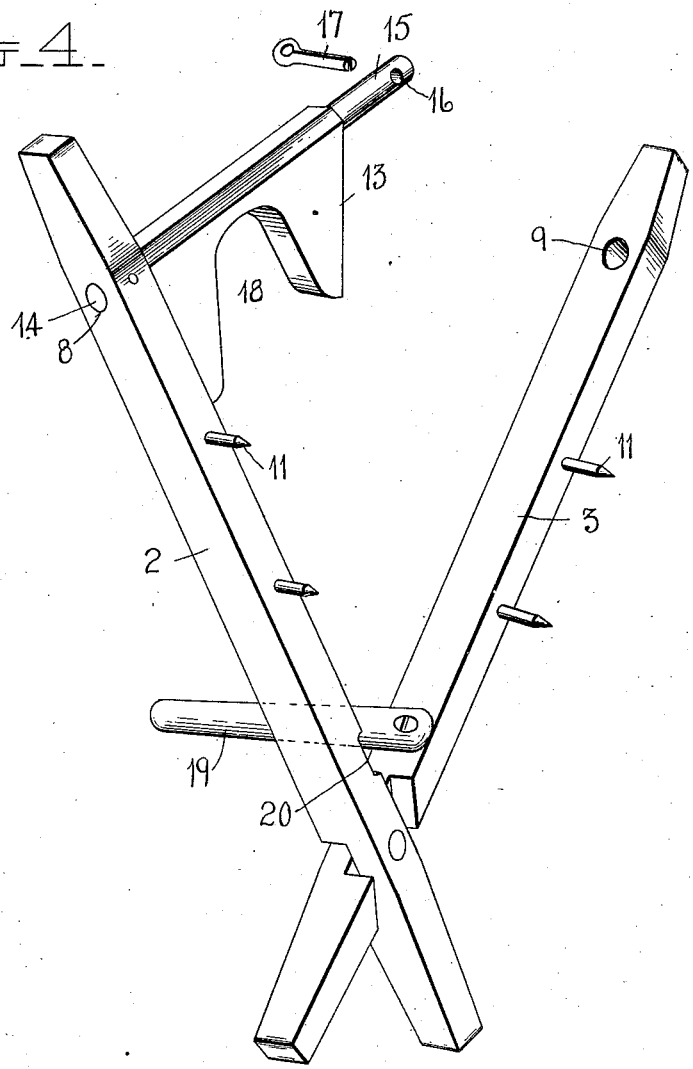
Witnesses
L. B. James
C. H. Griesbauer
Inventor
J. P. Shaw
by H. B. Willson & Co.
Attorneys

UNITED STATES PATENT OFFICE.

JOHN P. SHAW, OF ABERDEEN, MISSISSIPPI.

ANIMAL-YOKE.

No. 865,953.  Specification of Letters Patent.  Patented Sept. 10, 1907.

Application filed May 9, 1907. Serial No. 372,779.

*To all whom it may concern:*

Be it known that I, JOHN P. SHAW, a citizen of the United States, residing at Aberdeen, in the county of Monroe and State of Mississippi, have invented certain new and useful Improvements in Animal-Yokes; and I do declare the following to be a full, clear, and exact description of the invention, such as will enable others skilled in the art to which it appertains to make and use the same.

This invention relates to animal yokes or pokes.

The object of the invention is to improve the construction of animal yokes and to provide an exceedingly simple and inexpensive device adapted to effectually prevent an animal from breaking through fences, hedges and other barriers, and also to prevent it from jumping.

In the accompanying drawings,—Figure 1 represents a rear elevation of this improved yoke; Fig. 2 represents a perspective view of one member thereof detached; and Fig. 3 represents a side elevation of the connecting member. Fig. 4 represents a perspective view of a modified form of yoke in open position.

In the embodiment of the invention illustrated in Figs. 1, 2 and 3 a V-shaped yoke 1 is shown composed of two members 2 and 3, each having a recess, as 4, formed in one face thereof near one end. The walls of these recesses are inclined upwardly, as shown at 5, and serve to limit the opening and closing movement of the members. These members 2 and 3 are assembled by overlapping their recessed ends with the walls of the recesses engaging each other and pivoting them together as by a bolt or pin 6. Each of these members is preferably provided on its inner face with a projection or block, as 7, curved to fit the neck of the animal. These members 2 and 3 are provided below the blocks, as 7, with registering apertures 8 and 9 to receive a coupling bolt or member 10 for securing the yoke to the neck of the animal. This bolt has an enlarged head at one end and a series of apertures at its other end to receive a cotter pin 10′ or other fastening device for holding the yoke securely in position. The inner face of the head of this bolt 10 is beveled, at 12, to fit tightly against the side of the member through which it passes.

The rear face of the members 2 and 3 and of the blocks, as 7, have sharp barbs or spurs, as at 11, projecting therefrom normally out of engagement or away from the animal. Should the animal attempt to force its way through a fence, hedge or other barrier, the spurs or barbs, as 11, will be forced into the animal and the latter will be effectually deterred from advancing or forcing its way through such barrier.

The form illustrated in Fig. 4 is similar to that shown in the other figures with the exception of the coupling bolt or member for connecting the free ends of the yoke said yoke being shown in reverse position to that shown in the other figures. In Fig. 4, this coupling member is made in the form of a block 13 having its ends beveled to fit between the free ends of the side members 2 and 3 and provided with studs 14 and 15 to fit in the apertures 8 and 9 of said members 2 and 3. One of the studs here shown as 14 is secured to the side member 2 by a pin or other suitable fastening device and the other stud 15 has an aperture 16 therein to receive a cotter pin 17 or other fastening device for securing the yoke in position on the neck of the animal. The block 13 has its lower face recessed at 18 to fit the neck of the animal and the beveled ends thereof serve to hold the members 2 and 3 suitably spaced.

An outwardly projecting arm 19 is pivoted to one of the side members of the yoke adjacent to their overlapping connecting ends which serve as additional means for preventing cattle from breaking over or through fences.

Having thus described my invention, what I claim is:—

1. An animal yoke comprising two members overlapping at one end and having recesses in their adjacent overlapping faces provided with inclined walls to limit the opening and closing movements of the members, and means for detachably connecting the other ends of said members.

2. An animal yoke comprising two members overlapping at one end and having recesses in their adjacent overlapping faces, said ends being pivotally connected, and said members having registering apertures in their other ends, and a connecting member having arms or studs extending through said apertures and having its ends beveled to fit the inner faces of the side members.

3. An animal yoke comprising two members overlapping at one end and having recesses in their adjacent overlapping faces provided with inclined walls to limit the opening and closing movements of the members, means for detachably connecting the other ends of said members, and spurs projecting inwardly from the rear face of said members.

4. An animal yoke comprising two members overlapping at one end and having recesses in their adjacent overlapping faces, said ends being pivotally connected, and said members having registering apertures in their other ends, and a connecting member having arms or studs extending through said apertures and having its ends beveled to fit the inner faces of the side members, said connecting member being recessed to fit the neck of the animal.

5. An animal yoke comprising two members pivotally connected at one end and having registering apertures in their other ends and a block having arms or studs at its opposite ends to extend into said apertures, said block having a recess in its inner face to fit the neck of the animal and its ends beveled to fit the inner faces of the pivotally connected members.

In testimony whereof I have hereunto set my hand in presence of two subscribing witnesses.

JOHN P. SHAW.

Witnesses:
WM. H. HOLMES,
GEO. F. DARRACOTT.